(12) United States Patent
Lee et al.

(10) Patent No.: US 12,531,516 B2
(45) Date of Patent: Jan. 20, 2026

(54) AMPLITUDE MODULATION TRANSMISSION DEVICE

(71) Applicants: SKAIChips Co., Ltd., Suwon-si (KR); Research & Business Foundation SUNGKYUNKWAN UNIVERSITY, Suwon-si (KR)

(72) Inventors: Kang Yoon Lee, Seoul (KR); Yeon Jae Jung, Seoul (KR); Young Gun Pu, Suwon-si (KR); Sung Jin Kim, Suwon-si (KR); Myeong Gwan Kim, Suwon-si (KR); Seung Hyeon Byun, Incheon (KR); Hyun Jin Jung, Suwon-si (KR); Dong Jin Kim, Suwon-si (KR); Ji Hoon Song, Suwon-si (KR); Kyung Je Jeon, Suwon-si (KR)

(73) Assignees: SKAIChips Co., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 88 days.

(21) Appl. No.: 18/370,414

(22) Filed: Sep. 20, 2023

(65) Prior Publication Data
US 2025/0096909 A1 Mar. 20, 2025

(51) Int. Cl.
*H03F 1/02* (2006.01)
*H03F 3/217* (2006.01)
(Continued)

(52) U.S. Cl.
CPC ........ *H03F 1/0244* (2013.01); *H03F 3/2171* (2013.01); *H04B 14/004* (2013.01);
(Continued)

(58) Field of Classification Search
CPC ....... H04L 27/02; H04L 27/04; H04B 14/004; H04B 14/023; H03F 1/0244;
(Continued)

(56) References Cited

U.S. PATENT DOCUMENTS 8,831,138 B2 * 9/2014 Moser .................... H03F 3/211
330/135
9,444,501 B1 * 9/2016 Kirkpatrick ............... H03F 3/24
(Continued)

FOREIGN PATENT DOCUMENTS

KR 10-0799227 B1 1/2008
KR 10-2008-0087465 A 10/2008
(Continued)

OTHER PUBLICATIONS

Korean Office Action mailed on Jul. 4, 2023 from Korean Patent Office for Application No. 10-2022-0046283.
(Continued)

*Primary Examiner* — Betsy Deppe

(57) ABSTRACT

A technology related to a transmission device of an amplitude modulation method is disclosed. In the amplitude modulation transmission device, a transmission data signal transformed into a sinusoidal wave transition form is input to a signal input stage of a cascode power amplifier, and a transmission data signal transformed into another sinusoidal wave transition form is input to a bias power stage of the cascode power amplifier. The transmission data signal transformed into the sinusoidal wave transition form has a sinusoidal wave form in a section in which input data transitions and maintain its previous value in a section in which the input data is maintained.

9 Claims, 4 Drawing Sheets

(51) Int. Cl.
*H04B 1/04* (2006.01)
*H04B 14/00* (2006.01)
*H04L 27/04* (2006.01)

(52) U.S. Cl.
CPC ........ *H04L 27/04* (2013.01); *H03F 2200/339* (2013.01); *H04B 2001/0416* (2013.01)

(58) Field of Classification Search
CPC ........ H03F 3/2171; H03F 3/2175; H03F 3/20; H03F 3/211; H03F 3/24; H03K 7/02
See application file for complete search history.

(56) References Cited

U.S. PATENT DOCUMENTS

| | | |
|---|---|---|
| 2014/0111279 A1 | 4/2014 | Brobston |
| 2014/0312974 A1 | 10/2014 | Khesbak et al. |
| 2014/0354358 A1 | 12/2014 | Kim et al. |
| 2017/0222606 A1 | 8/2017 | Tanio |
| 2017/0279412 A1 | 9/2017 | Afsahi et al. |
| 2018/0248570 A1 | 8/2018 | Camuffo |

FOREIGN PATENT DOCUMENTS

| | | | | |
|---|---|---|---|---|
| KR | 10-2008-0090127 A | | 10/2008 | |
| KR | 20080090127 A | * | 10/2008 | ............... H03F 3/20 |
| KR | 10-2014-0141106 A | | 12/2014 | |

OTHER PUBLICATIONS

Korean Notice of Allowance mailed on Oct. 19, 2023 from Korean Patent Office for Application No. 10-2022-0046283.
European Office Action dated Apr. 5, 2024 from European Patent Office for Application No. 23200456.4.
European Search Report dated Mar. 11, 2024 from European Patent Office for Application No. 23200456.4.

* cited by examiner

AMPLITUDE MODULATION TRANSMISSION DEVICE

BACKGROUND

1. Field

A communication technology, in particular, a technology related to a transmission device of an amplitude modulation method is disclosed.

2. Description of Related Art

Amplitude modulators are often implemented in an analog manner using frequency mixers. This manner has a disadvantage in the implementation in that the area of an integrated circuit is large and power consumption is high.

Korean Patent No. 799,227, filed on May 11, 2006 and registered on Jan. 23, 2008, discloses an amplitude modulation transmission device using a cascode power amplifier at an output stage. This patent discloses a pulse shaping circuit configured to adjust a waveform of a baseband signal to have a voltage level suitable for a common gate amplifier through a bias part.

Communication systems, such as mobile telecommunication systems, have different operating parameters applied for each country or each service provider. Accordingly, an amplitude modulation transmission device used at a terminal's output end has different values of a parameter, for example, a modulation index. It is difficult to cover the required modulation index range by solely modulating an input signal of the cascode power amplifier.

PRIOR ART DOCUMENT

Patent Documents (Patent document 1) Patent Document No. 799,227 (filed on May 11, 2006, and registered on Jan. 23, 2008)

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to presenting a structure of an amplitude modulator having a sufficient range of variation of a modulation index.

The following description also relates to presenting a structure of an amplitude modulator whose operating parameter is easily changed.

In an amplitude modulation transmission device according to one aspect of the proposed invention, a transmission data signal transformed into a sinusoidal wave transition form is input to a signal input stage of a cascode power amplifier, and a transmission data signal transformed into another sinusoidal wave transition form is input to a bias power stage of the cascode power amplifier.

According to another aspect of the proposed invention, a transmission data signal transformed into a sinusoidal wave transition form may have a sinusoidal wave form in a section in which input data transitions and maintain its previous value in a section in which the input data is maintained.

According to an additional aspect of the proposed invention, a controlled delay may be applied to at least one of a signal input to a signal input stage of the cascode power amplifier and a signal input to a bias power stage of the cascode power amplifier so that the two signals have the same phase.

According to another aspect, a transmission data signal, which is transformed into the form of a sinusoidal wave in a transition section, may be input to a signal input stage of a differential cascode amplifier and supplied as a control signal for additionally modulating a bias of the amplifier.

DETAILED DESCRIPTION

The foregoing and additional aspects of the present invention will be embodied through the following embodiments described with reference to the accompanying drawings. It should be understood that various combinations of components in each embodiment are possible unless otherwise specified or contradicted within the embodiment. It will be understood that words or terms used in the specification and claims should be interpreted as having a meaning that is consistent with their meaning in the context of the description and the technical idea of the proposed invention, based on the principle that an inventor may properly define the meaning of the words or terms to best explain the invention. Hereinafter, exemplary embodiments of the present invention will be described in detail with reference to the accompanying drawings.

<Description of Invention of claims 1, 2, and 3>

In an amplitude modulation transmission device according to one aspect of the proposed invention, a transmission data signal transformed into a sinusoidal wave transition form is input to a signal input stage of a cascode power amplifier, and a transmission data signal transformed into another sinusoidal wave transition form is input to a bias power stage of the cascode power amplifier.

Figure 1:
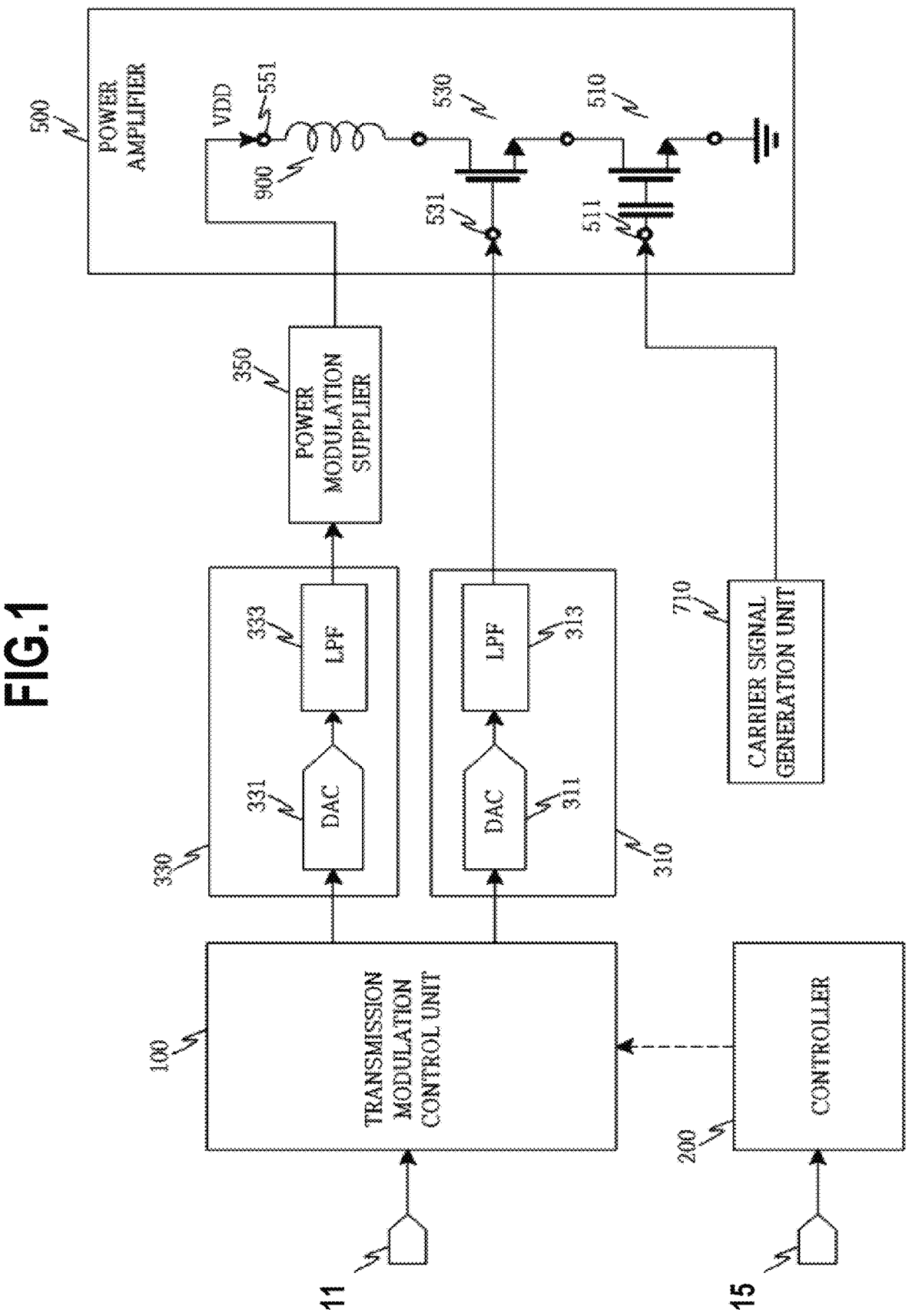
FIG. 1 is a block diagram illustrating a configuration of an amplitude modulation transmission device according to one embodiment.

FIG. 1 is a block diagram illustrating a configuration of an amplitude modulation transmission device according to one embodiment. The amplitude modulation transmission device according to one embodiment includes a transmission modulation control unit 100, a first digital-analog conversion unit 310, a second digital-analog conversion unit 330, a power modulation supplier 350, and a cascode power amplifier 500.

In one embodiment, the amplitude modulation transmission device may further include a controller 200. The controller 200 may receive an operation mode instruction 15 and control the operations of internal components according thereto. The operation mode instruction 15 may be, for example, an electrical signal input by a set voltage of one terminal among terminals of a semiconductor integrated circuit constituting the amplitude modulation transmission device. In the illustrated embodiment, the controller 200 may be implemented as a microprocessor, a memory, and program instructions stored in the memory and read and executed by the microprocessor.

According to another aspect of the proposed invention, a transmission data signal transformed into a sinusoidal wave transition form may have a sinusoidal wave form in a section in which input data transitions and maintain its previous value in a section in which the input data is maintained.

Figure 2:
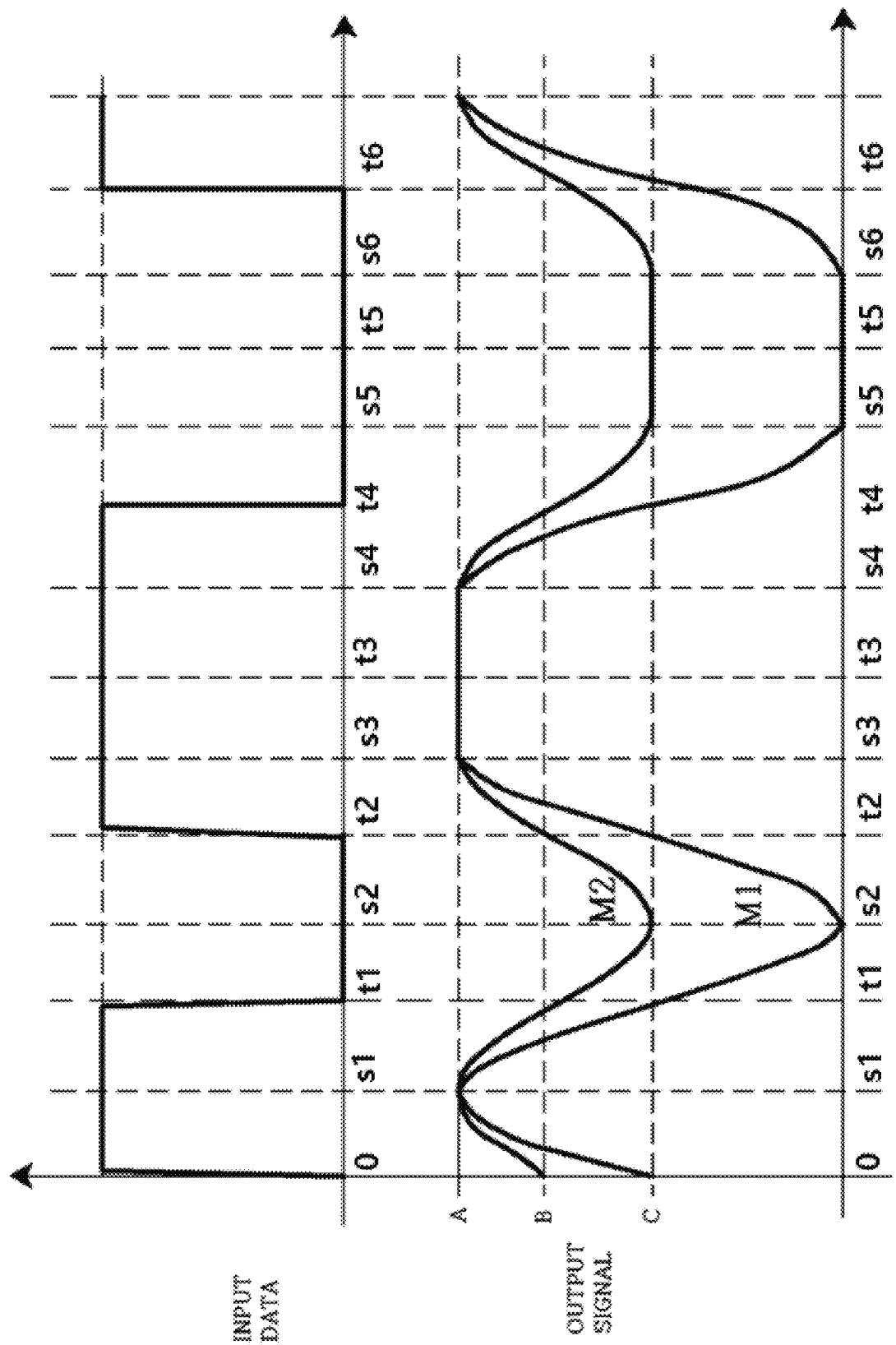
FIG. 2 is an exemplary waveform diagram illustrating an operation of a transmission modulation control unit.

In accordance with this aspect, the transmission modulation control unit 100 receives binary digital transmission data, transforms it into a sinusoidal wave transition form during the transition section, and outputs the transformed data. FIG. 2 is an exemplary waveform diagram illustrating an operation of the transmission modulation control unit. As illustrated in the drawing, digital data input in each transition section is converted into a transition signal in the form of a sinusoidal wave. In order to support a wide range of modulation indices, as illustrated in the drawing, an offset is added to the output signal in the form of a sinusoidal wave to have a fixed maximum value A at different values of the modulation indices.

For example, in the drawing, a section between sections s1 and s2 is a section in which the input data transitions from a state of "1" to a state of "0", and among the output signals, M1 is transformed into a sinusoidal wave that transitions in value from "A" to "0" through the values of "B" and "C". In addition, in the drawing, a section between sections s2 and s3 is a section in which the input data transitions in state from "0" to "1", and among the output signals, M1 is transformed into a sinusoidal wave that transitions in value from "0" to "A" through the values of "C" and "B".

Further, in a section in which the binary digital transmission data maintains its previous value, the transmission modulation control unit 100 also maintains the previous value of the output signal. For example, in FIG. 2, a section between sections s3 and s4 is a section in which the input data remains in a state of "1", and among the output signals, M1 also maintains its previous value, that is, the value "A". In addition, a section between s5 and s6 is a section the input data remains in a state of "0", and among the output signals, M2 maintains its previous value, that is, the value "C".

The transmission modulation control unit 100 may be implemented as a logic circuit that divides input data for each section using synchronized divided clocks and substitutes the input data with digital values as shown in the illustrated output signal. The transmission modulation control unit 100 outputs the transformed signal as a first modulated transmitting signal and a second modulated transmitting signal. Here, the first modulated transmitting signal and the second modulated transmitting signal may be the same signal, may be signals having a time difference due to a phase difference or delay, or may be signals to which an offset is added, or signals multiplied by a constant.

The first digital-analog conversion unit 310 converts and outputs the first modulated transmitting signal into a first analog transmitting signal. The second digital-analog conversion unit 330 converts and outputs the second modulated transmitting signal into a second analog transmitting signal. The first digital-analog conversion unit 310 may include a first digital-to-analog converter (DAC) 311 and a first low-pass filter (LPF) 313. The second digital-analog conversion unit 330 may include a second DAC 331 and a second LPF 333.

The power modulation supplier 350 adjusts and outputs a supply power according to the second analog transmitting signal. The supply power may be output from a power supply circuit configured to supply an operating power of the amplitude modulation transmission device. In one embodiment, the power modulation supplier 350 modulates a power signal output from the power supply circuit to a voltage regulated according to the second analog transmitting signal and outputs the modulated voltage. For example, the power signal supplied by the power modulation supplier 350 may be a power signal that has the waveform of M1 among the output signals of FIG. 2, but has a voltage level that is a constant multiple of M1. The power supply circuit may be, for example, a switching power supply.

The cascode power amplifier 500 includes a common source amplifier 510 to which a carrier signal is input, and a common gate amplifier 530 to which the first analog transmitting signal is input. An output of the power modulation supplier 350 is applied to a bias power stage 551 of the cascode power amplifier 500. A cascode amplifier refers to a two-stage amplifier with a structure that supplies a common emitter output to a common-base stage.

The illustrated cascode power amplifier is designed using a field-effect transistor for power. A carrier signal generated by a carrier signal generation unit 710 is input to a gate 511 of the common source amplifier of the cascode power amplifier 500. A source of the common gate amplifier 530 is connected to a drain of the common source amplifier 510, and the first analog transmitting signal is input to a gate 531 of the common gate amplifier 530. In addition, a transmission load, in this embodiment, an output transformer 900 is connected to an output stage of the common gate amplifier 530. The output of the power modulation supplier 350 is applied to the other end 551 of the output transformer 900. The carrier signal generation unit 710 generates a carrier signal required for amplitude modulation and is often implemented using a phase-locked loop (PLL) or the like.

<Description of Invention of claim 4>

Figure 3:
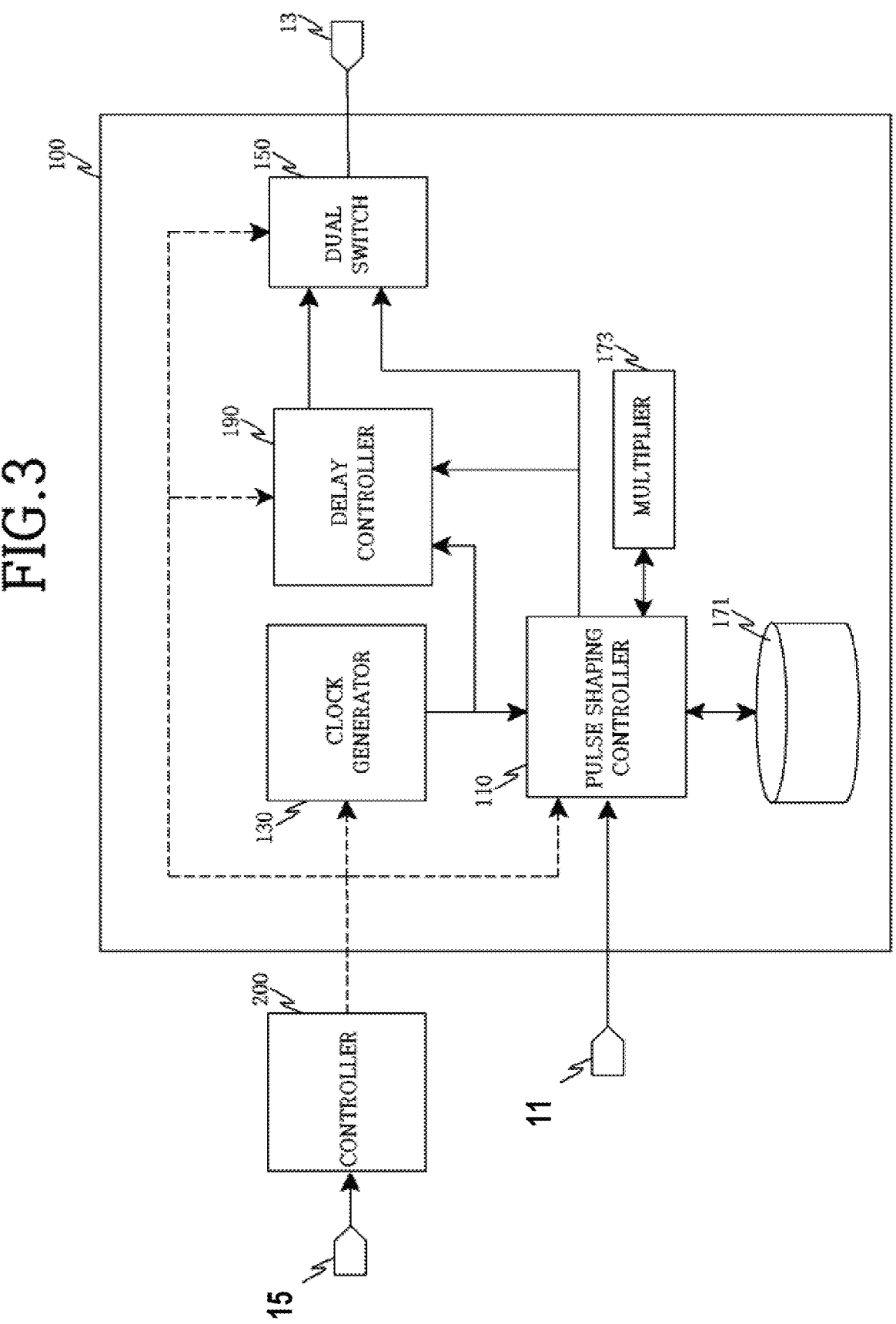
FIG. 3 is a block diagram illustrating a configuration of the transmission modulation control unit according to one embodiment.

FIG. 3 is a block diagram illustrating a configuration of the transmission modulation control unit according to one embodiment. In the illustrated embodiment, the transmission modulation control unit includes a pulse shaping controller 110. The pulse shaping controller 110 substitutes the input digital transmission data in the transition section with corresponding sinusoidal wave transition section data by referencing a lookup table. In one embodiment, the pulse shaping controller 110 may include a signal processor and a memory 171. The signal processor detects a unit section from the binary digital transmission data input through a serial buffer and processes data conversion in the unit section. When the unit section is a section transitioning from "0" to "1", such as the section between sections s2 and s3 in FIG. 2, one of the values of the M1 signal and M2 signal in the corresponding section is read from the lookup table in the memory 171 based on the set value, and then, substituted and output. When the unit section is a section transitioning from "1" to "0", such as the section between sections s1 and s2 in FIG. 2, one of the values of the M1 signal and M2 signal in the corresponding section is read from the lookup table in the memory 171 based on the set value, and then, substituted and output. When the unit section is an unchanged section, such as the section between sections s3 and s4 in FIG. 2, the previous output signal is maintained and output during that section.

<Description of Invention of claims 5 and 6>

According to an additional aspect of the proposed invention, a controlled delay may be applied to at least one of a signal input to a signal input stage of the cascode power amplifier and a signal input to a bias power stage of the cascode power amplifier so that the two signals have the same phase. According to this aspect of the proposed invention, in FIG. 3, the transmission modulation control unit may further include a delay controller 190 and a dual switch 150. The delay controller 190 delays and outputs the output of the pulse shaping controller 110 by an instructed amount of delay. For example, the delay controller 190 may be implemented by including an array of analog switches and an array of delay taps, and turning the array of analog switches on and off to control the number of connected delay taps. In one embodiment, the delay controller 190 may delay and output the output of the pulse shaping controller by as much as a delay in the power modulation supplier. In the illustrated embodiment, the delay controller 190 is designed such that the amount of delay is adjustable in the range of 1 to 9 clocks. Accordingly, in FIG. 1, the first analog transmitting signal input to the common gate amplifier of the cascode power amplifier 500 and the output of the power modulation supplier applied to the bias power stage may have the same phase.

The dual switch 150 controls the connection of the output of the delay controller 190 and the output of the pulse shaping controller 110 to the power modulation supplier 350 or the power amplifier 500 in FIG. 1. This allows the dual switch 150 to select which one of the output to the power amplifier 500 and the output to the power modulation supplier 350 will be delayed. For example, when a control instruction from the controller 200 has "1", the dual switch 150 connects the output of the delay controller 190 to the power amplifier 500 and the output of the pulse shaping controller 110 to the power modulation supplier 350 in order to delay the output to the power amplifier 500. In addition, when the control instruction from the controller 200 has "0", the dual switch 150 connects the output of the delay controller 190 to the power modulation supplier 350 and the output of the pulse shaping controller 110 to the power amplifier 500 in order to delay the output to the power modulation supplier 350.

<Description of Invention of claim 7>

Referring to FIG. 3 again, in one embodiment, the transmission modulation control unit may include a clock generator 130 and a multiplier 173. The clock generator 130 supplies one of a plurality of clocks as an operation clock depending on a set specification mode. In one embodiment, the clock generator 130 may output one of three clocks of 32.768 MHZ, 16.384 MHZ, and 8.129 MHZ. The plurality of clocks may be generated by a controllable frequency divider in the clock generator. The multiplier 173 performs multiplication of binary data.

The pulse shaping controller 110 may operate according to the operation clock supplied from the clock generator 130, read the sinusoidal wave transition section data corresponding to the digital transmission data in the transition section input from the lookup table, and selectively multiply the sinusoidal wave transition section data with a first value using the multiplier or adds a second value to substitute and output the transition section data depending on the set specification mode.

For example, the signal portion in the form of a sinusoidal wave in FIG. 2 may be expressed in the form of "p*coswt+q". The output data may be calculated by multiplying the value of p after reading the value of coswt from the lookup table, and adding q.

Communication systems, such as mobile telecommunication systems, have different operating parameters applied for each country or each service provider. Accordingly, an amplitude modulation transmission device used at a terminal's output end has different values of a parameter, such as a modulation index. In one embodiment of the proposed invention, the modulation index may be adjusted in the widest range of 0.33 to 0.99.

In the amplitude modulation, the modulation index may be expressed as (A−B)/(A+B), where A is the maximum amplitude and B is the minimum amplitude in the envelope of the modulated waveform. In order to achieve a wide variation range of modulation indices, it is necessary to increase a sweep range of the sinusoidal wave, which cannot be achieved solely by controlling an input signal of the cascode amplifier. The proposed invention overcomes this limitation by synchronizing and controlling biases of the cascode amplifiers together.

In the illustrated embodiment, the controller 200 may receive the operation mode instruction 15 and control the operations of internal components according thereto. The controller 200 controls the divider of the clock generator 130 according to the operation mode instruction 15 to set an output clock. In addition, the controller 200 controls the pulse shaping controller 110 to determine and apply values of p and q from modulated sinusoidal wave basic transition section data of "p*coswt+q" described above to achieve a modulation index determined depending on the operation mode. Further, the amount of delay of the delay controller 190 is controlled according to a value determined according to the amount of delay of the supply power modulator. Subsequently, the outputs are switched and distributed by the dual switch 150.

<Description of Invention of claim 9>

Figure 4:
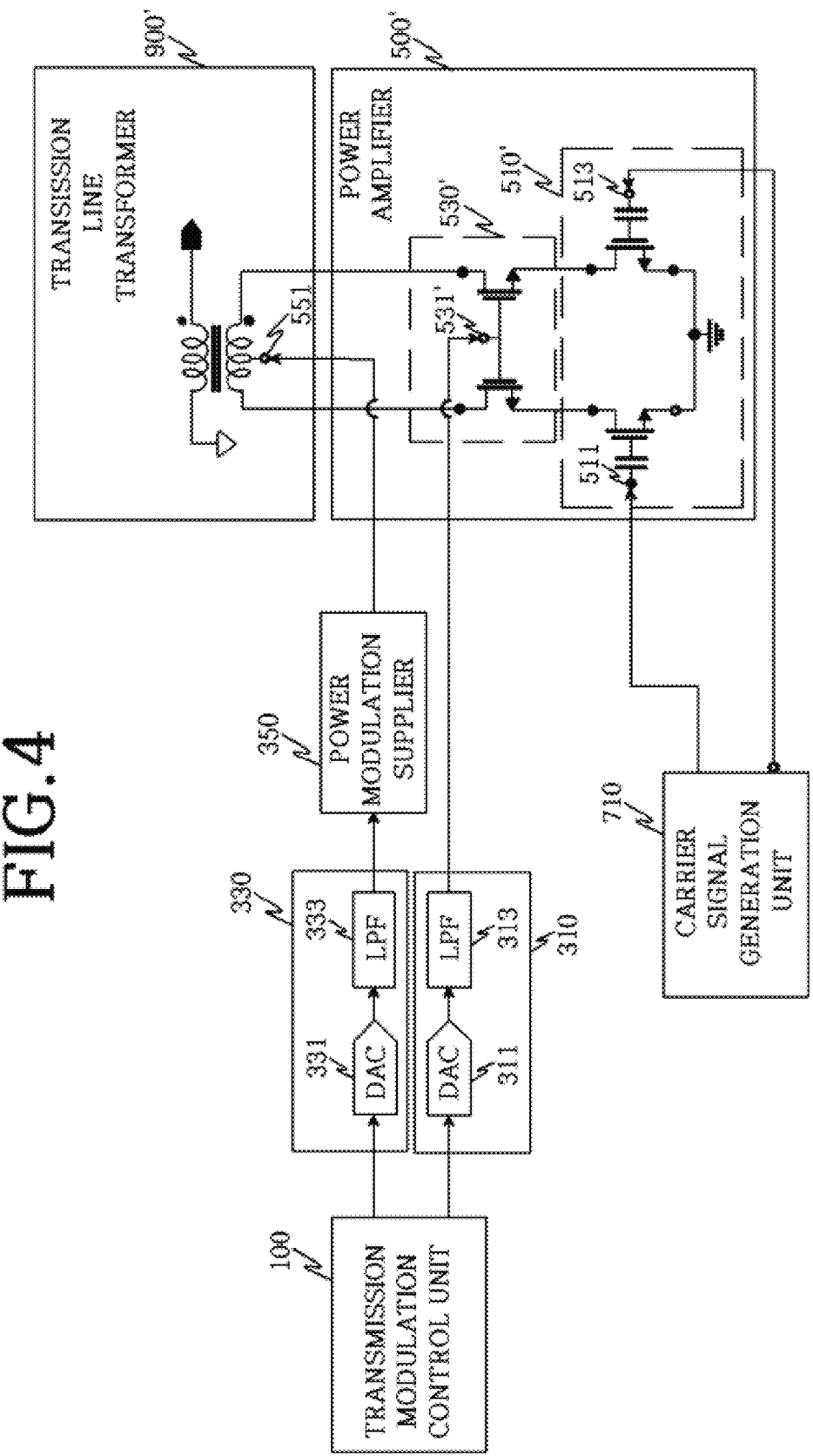
FIG. 4 is a block diagram illustrating a configuration of an amplitude modulation transmission device according to another embodiment.

According to another aspect, the transmission data signal, which is transformed into the form of a sinusoidal wave in the transition section, may be input to a signal input stage of a differential cascode amplifier and supplied as a control signal for additionally modulating a bias of the amplifier. FIG. 4 is a block diagram illustrating a configuration of an amplitude modulation transmission device according to another embodiment. The illustrated embodiment is similar to the embodiment illustrated in FIG. 1 except that the power amplifier at the output stage is replaced by a class-AB differential cascode amplifier. Components corresponding to FIG. 1 are referenced by the same reference numerals.

As illustrated in the drawing, a differential cascode power amplifier 500' according to another embodiment includes a differential common source amplifier 510' and a differential common gate amplifier 530'. A carrier signal is input to a gate input stage 511 of the differential common source amplifier 510', and an inverted carrier signal is input to a gate input stage 513 thereof. The first analog transmitting signal output from the transmission modulation control unit 100 and converted into an analog signal by the first digital-analog conversion unit 310 is input to a common gate 531' of the differential common gate amplifier 530'. According to an additional aspect, an output stage of the differential common gate amplifier 530' is connected to a transmission load 900'. In the illustrated embodiment, a transmission line transformer may be connected as the transmission load 900'. In the illustrated embodiment, a primary coil of the transmission line transformer 900' is connected between drain terminals, which are the output stages, of the differential common gate amplifier 530', and a secondary side coil thereof is connected to a transmission line. According to an additional aspect, an output of the power modulation supplier is applied to a center tab of the primary coil of the transmission line transformer 900'. By supplying a synchronized modulated transmitting signal to not only the signal input stage of the power amplifier but also the bias stage of the power amplifier, a wide range of modulation indices can be achieved, and multiple specifications can be supported by changing the mode of a single amplitude modulation transmission semiconductor. In the embodiment of FIG. 4, the remaining components are similar to those of the embodiment of FIG. 1, and thus detailed descriptions thereof will be omitted.

According to the proposed invention, digital transmission data, which is a square wave, is transformed into a sinusoidal wave transition form in a time domain, and then amplitude-modulated and transmitted, so that a bandwidth of a signal in a frequency domain can be reduced. Accordingly, it is possible to configure a transmission circuit with low-cost circuit elements having a narrow operating bandwidth.

In order to achieve a wide range of modulation indices, it is necessary to increase a sweep range of the sinusoidal wave, which cannot be achieved solely by controlling an input signal of a cascode amplifier. The proposed invention overcomes this limitation by synchronizing and controlling biases of the cascode amplifier together.

The present invention has been described above with reference to the embodiments referring to the accompanying drawings, but is not limited thereto. Rather, the present invention should be construed as encompassing various modifications that may be apparent to those skilled in the art. The appended claims are intended to cover such modifications.

What is claimed is:

1. An amplitude modulation transmission device comprising:
a transmission modulation control unit configured to receive binary digital transmission data, and transform and output the binary digital transmission data in a transition section into a signal in a sinusoidal wave transition form, wherein the transmission modulation control unit outputs a first modulated transmitting signal and a second modulated transmitting signal;
a first digital-analog conversion unit configured to convert the first modulated transmitting signal into a first analog transmitting signal;
a second digital-analog conversion unit configured to convert the second modulated transmitting signal into a second analog transmitting signal;
a power modulation supplier configured to adjust and output a supply power according to the second analog transmitting signal; and
a cascode power amplifier including a common source amplifier to which a carrier signal is input and a common gate amplifier to which the first analog transmitting signal is input, and having a bias power stage to which an output of the power modulation supplier is applied.

2. The amplitude modulation transmission device of claim 1, wherein the transmission modulation control unit transforms the binary digital transmission data such that, in a section in which the binary digital transmission data maintains its previous value, the first modulated transmitting signal and the second modulated transmitting signal also maintains their previous values, respectively.

3. The amplitude modulation transmission device of claim 1, wherein the cascode power amplifier includes the common source amplifier having a gate to which the carrier signal is input, the common gate amplifier having a source connected to a drain of the common source amplifier and a gate to which the first analog transmitting signal is input, and a transmission load having one end connected to a drain of the common gate amplifier and the other end to which the output of the power modulation supplier is applied.

4. The amplitude modulation transmission device of claim 1, wherein the transmission modulation control unit includes a pulse shaping controller configured to substitute the received binary digital transmission data in the transition section with corresponding sinusoidal wave transition section data by referencing a lookup table (LUT).

5. The amplitude modulation transmission device of claim 4, wherein the transmission modulation control unit further includes:
a delay controller configured to delay an output of the pulse shaping controller by a delay amount specified in an instruction and output the delayed output; and
a dual switch configured to output one selected from the output of the pulse shaping controller and the output of the delay controller as the first modulated transmitting signal or the second modulated transmitting signal.

6. The amplitude modulation transmission device of claim 5, wherein the delay controller delays the output of the pulse shaping controller by as much as a delay in the power modulation supplier.

7. The amplitude modulation transmission device of claim 1, wherein the transmission modulation control unit includes:
a clock generator configured to supply one of a plurality of clocks as an operation clock depending on a set specification mode;
a multiplier configured to perform multiplication of binary data; and
a pulse shaping controller configured to be operated according to the operation clock, read sinusoidal wave transition section data corresponding to the digital transmission data in the transition section input from a lookup table, and selectively multiply the sinusoidal wave transition section data by a first value using the multiplier.

8. The amplitude modulation transmission device of claim 7, wherein the transmission modulation control unit further includes:
a delay controller configured to delay an output of the pulse shaping controller by a delay amount specified in an instruction and output the delayed output; and
a dual switch configured to output one selected from the output of the pulse shaping controller and the output of the delay controller as the first modulated transmitting signal or the second modulated transmitting signal.

9. The amplitude modulation transmission device of claim 1, wherein the common source amplifier is a differential common source amplifier having gates to which the carrier signal and an inverted carrier signal are input, respectively, the common gate amplifier is a differential common gate amplifier having sources connected to drains of the differential common source amplifier and a common gate to which the first analog transmitting signal is input, and the bias power stage includes a transmission line transformer having both ends connected to drains of the differential common gate amplifier and including a primary coil with a center tap to which the output of the power modulation supplier is applied.

* * * * *